(12) United States Patent
Walther

(10) Patent No.: US 6,541,528 B1
(45) Date of Patent: Apr. 1, 2003

(54) FLEXIBLE POLYMER FOAMS, THEIR PRODUCTION AND USE

(75) Inventor: Werner Walther, Stuttgart (DE)

(73) Assignee: Clariant Finance (BVI) Limited, Tortola (BG)

( * ) Notice: Subject to any disclaimer, the term of this patent is extended or adjusted under 35 U.S.C. 154(b) by 0 days.

(21) Appl. No.: 09/143,947

(22) Filed: Aug. 13, 1998

(30) Foreign Application Priority Data

Sep. 3, 1997 (GB) .............................. 9718596

(51) Int. Cl.⁷ .............................. C08J 9/28; B05D 1/02
(52) U.S. Cl. .................. 521/71; 427/244; 427/246; 428/318.4; 428/319.1; 428/422.8; 156/43; 156/77; 156/78; 156/79; 521/72; 106/122
(58) Field of Search .................. 428/318.4, 319.1, 428/422.8; 427/244, 246; 156/43, 77, 78, 79; 521/72, 71

(56) References Cited

U.S. PATENT DOCUMENTS

| 3,586,651 | A | 6/1971 | Salyer et al. ............... 521/131 |
| 4,496,625 | A | 1/1985 | Snider et al. |
| 4,833,173 | A | 5/1989 | Spek et al. |
| 5,096,933 | A | 3/1992 | Volkert ....................... 521/131 |
| 5,387,618 | A | 2/1995 | Smits |
| 5,416,130 | A | 5/1995 | Liman et al. |
| 5,531,924 | A | 7/1996 | Horn et al. |

FOREIGN PATENT DOCUMENTS

| GB | 819164 | 8/1959 |
| GB | 1571171 | 7/1980 |

OTHER PUBLICATIONS

British Patent Office Search Report.

Primary Examiner—Morton Foelak
(74) Attorney, Agent, or Firm—Scott E. Hanf

(57) ABSTRACT

Flexible polyurethane, polyacrylic and polybutadiene foams can be obtained with cyclopentane as a blowing agent and are useful as coatings for leather or leather substitutes.

24 Claims, No Drawings

FLEXIBLE POLYMER FOAMS, THEIR PRODUCTION AND USE

This invention is concerned with making flexible foams with chemical blowing agents and with substrates coated with the foams so produced.

BACKGROUND OF THE INVENTION

Chlorofluorocarbons have found use worldwide as blowing agents in the manufacture of polyurethane foams. However, the objection to the use of such compounds has required effort on the part of industry to produce environmentally less damaging alternatives.

It is known to employ solvents and solvent mixtures in polymeric compositions which will, under favorable conditions, act to foam said polymeric compositions. Rigid polyurethane foams have been produced in this way having end applications, for example, as insulating layers in construction panels, for refrigeration units and for lagging of pipes.

However, in application wherein a flexible foam is to be applied as coating to improve the handle and the aesthetic quality of a flexible substrate to which it is applied, for example, in the leather industry, solvent blowing agents have not been usefully employed as the requisite fineness and firmness of the foam for this application has not heretofore been obtainable.

Foams suitable for the application described in the preceding paragraph can be achieved by mechanical foaming techniques, however, some difficulty is encountered in the handling of such foams because of their instability.

It is desirable to form foams with solvent blowing agents which foams have the required firmness and fineness making them suitable for use as coatings for flexible substrates wherein said substrate is reliant upon the coating for its soft handle and aesthetic quality.

BRIEF SUMMARY OF THE INVENTION

It has now been found that certain organic solvents may be employed as blowing agents in polymeric compositions which are capable of forming a flexible coating on leather and leather substitutes.

DETAILED DESCRIPTION OF THE INVENTION

According to the invention there is provided a process for finishing leather and leather substitute substrates comprising the steps of:
  a) applying to the surface of said substrate an aqueous polymeric composition (C) comprising an amount of solvent blowing agent boiling in the range of from 40 to 60° C., effective to foam said composition; and
  b) applying heat to the coated substrate to foam and cure said polymeric composition (C) to form a flexible foam coating fixed to the substrate surface.

The aqueous polymeric composition (C), hereinafter referred to as composition (C), comprises a component (A) consisting of a polyurethane, a polyacrylic or polybutadiene resin or a mixture of such resins, optionally (B) at least one foam stabilizing component and the aforementioned blowing agent.

As component (A) there may be selected conventional polyurethanes which are useful in the formation of flexible foamed coatings, in particular those that are dispersible in water, principally those polyurethanes obtained by the reaction of dimethylolalkane carboxylic acids and diols, in particular macrodiols with diisocyanates and optionally diamino compounds.

The diisocyanates hereinabove mentioned are conventional and are preferably those in which at least a part thereof is aliphatic, e.g. open-chain aliphatic, cycloaliphatic or aliphatic having both open-chain and cycloaliphatic structure, and/or aromatic diisocyanates. The diisocyanates contain in the hydrocarbon radical, to which the two isocyanate groups are bound, advantageously 6 to 15 carbon atoms.

Aliphatic open-chain diisocyanates may be selected from, e.g. hexamethylenediisocyanate or trimethylhexylene-1,6-diisocyanate (in particular 2,2,4-trimethylhexylene-1,6-diisocyanate and 2,4,4-dimethylhexylene-1,6-diisocyanate). Cyclic diisocyanates may be selected from mono- and dicyclic diisocyanates, e.g. 2,4- or 2,6-tolylenediisocyanate, m-phenylenediisocyanate, xylylenediisocyanate, 4,4'-diphenylmethanediisocyanate, 3,3'-dimethyl-4,4'-diphenylmethanediisocyanate, dicyclohexylmethane-4,4'-, -4,2'- or -2,2'-diisocyanate wherein each cyclohexyl radical may optionally further bear a methyl group, 1,3-cyclohexylenediisocyanate, methyl substituted 1,3-cyclohexylenediisocyanate and isophoronediisocyanate.

The diols hereinabove mentioned are diols which are known to be useful in the preparation of polyurethanes to be dispersed in water and used in the production of flexible foams and are characteristically long chain diols. Principally, said diols are macrodiols, in particular polyetherdiols, polyesterdiols or polyesteretherdiols, among which polyalkyleneglycols are preferred, in particular polypropyleneglycols, polybutyleneglycols and mixed polypropylene- and -butyleneglycols. The polybutyleneglycols are principally those comprising oxygen-linked butylene-1,2-, -1,3-, 2,3- or -1,4-groups. Polypropyleneglycols and polybutyleneglycols, or corresponding mixed polyetherdiols, are principally addition products of the corresponding cyclic oxides (in particular oxiranes or tetrahydrofuran) to water or starting diols, which in particular contain 2 to 6 carbon atoms, e.g. ethyleneglycol, propyleneglycol, butyleneglycol, neopentylglycol or hexamethylenediol. Polypropyleneglycols are preferred.

The average molecular weight $M_w$ of the macrodiols is preferably in the range of 800 to 5000. By the suitable choice of the diols the properties of the polyurethanes may be influenced. A preferred group of diols is that of higher molecular weight macrodiols, in particular polyetherdiols with an average molecular weight $M_w$ in the range of 1000 to 5000, preferably 1200 to 4000, in particular 1500 to 3500.

Various diols having carboxy, sulfonic or ether groups can be employed for the production of ionomeric polyurethanes. In general, known carboxylic acids as are employed as carboxy-group-containing diols in the production of ionomeric carboxy-group-containing polyurethanes, in particular α,α-dimethylolalkane-carboxylic acids come into consideration. Principally they correspond to the formula

in which R signifies hydrogen or $C_{1-8}$-alkyl.

Preferably R signifies hydrogen or $C_{1-4}$-alkyl, in particular hydrogen or methyl.

Similarly, compounds containing sulfonic acid groups and 1,3-diols containing a polyether chain also come into consideration.

The molar ratio of the total non-ionogenic diols, in particular macrodiols, to the ionic-group-containing diol is advantageously in the range of 1:0.2 to 1:2, preferably in the range of 1:0.3 to 1:1.2.

Per mole of diol compounds employed (macrodiols and ionic-group-containing diols) there are employed advantageously 0.9 to 3 moles of diisocyanate compounds. If the diols and diisocyanates are reacted to form isocyanate terminated oligourethanes, which are then chain-extended with diamino compounds, the molar ratio of the diol compounds to the diisocyanate compounds is advantageously in the range of from 1:1.05 to 1:2.5, preferably 1:1.2 to 1:2.2.

The diamino compounds referred to above are known compounds and are principally aliphatic, saturated, open-chain or cyclic diamines with 2 to 10 carbon atoms in the aliphatic radical or also hydrazine, e.g. cyclohexylenediamine, isophoronediamine, ethylenediamine, propylene-1,2- or -1,3-diamine, hexamethylenediamine and 2,2,4- and/or 2,4,4-trimethylhexylene-1,6-diamine, among which the lower molecular weight open-chain diamines with 2 to 6 carbon atoms, in particular propylene-1,3-diamine and propylene-1,2-diamine, and isophoronediamine are preferred, or even hydrazine, the latter being preferably employed in the form of the hydrate.

The reaction of the isocyanate-terminated oligourethanes with the diamino-compounds takes place advantageously in aqueous medium, optionally in the presence of further diisocyanate. The diamino-compounds are advantageously employed in such amounts that there is achieved a reaction as complete as possible with respect of the available isocyanate groups. The chain extension reaction is carried out preferably to the extent that in the final product there are essentially no isocyanate groups or primary amino groups, i.e. to the extent that these groups are no longer titratable.

If desired for chain extension, there may be employed a simple diol instead of the diamino compound, e.g. a $C_{2-6}$-alkane diol, as mentioned above, or chain extension may be brought about with a diamino compound and diol.

As component (A) there may be selected also conventional polyacrylic resins which are (meth)acrylic(co) polymers, e.g. (co)polymerization products of (meth)acrylic acid alkyl esters in which the ester-forming alkyl radicals are optionally in part hydroxy-substituted; the unsubstituted alkyl radicals contain e.g. 1 to 12 carbon atoms, the hydroxy-substituted ones contain e.g. 2 to 4 carbon atoms; optionally there may be present non-ionogenic constituting comonomers, e.g. ethylene, acrylonitrile or optionally N-methylolated acrylamide, and/or anionic comonomers, e.g. (meth)acrylic acid and/or itaconic acid. The glass transition point of these binders is, in general, in the range of −40° C. to +20° C., preferably lower than +10° C., most preferably lower than +5° C. Finally, component (A) can also be selected from dispersions of polybutadiene resins which are copolymers of butadiene and acrylonitrile, acrylic acid or styrene.

As compounds (A) there is/are preferred (an) ionomeric polyurea-urethane(s) which are obtainable by the process described above from polyetherdiols, dimethylolcarboxylic acids of the formula (I), diisocyanates and diamino compounds.

The polyurethanes (A) have, upon fixation on the substrate by thermal treatment (in particular after the drying as described below), the character of elastomeric polyurethanes.

As the optional foam stabilizer (B) there may be employed known compounds, e.g. hydrosoluble fatty acid amides, hydrocarbon sulphonates or compounds with soap character (fatty acid salts), e.g. those in which the lipophilic radical contains 12 to 24 carbon atoms; in particular alkane sulphonates with 12 to 22 carbon atoms in the hydrocarbon radical, alkylbenzene sulphonates with 14 to 24 carbon atoms in the total hydrocarbon radical, or fatty acid amides or soap-type fatty acid salts of fatty acids with 12 to 24 carbon atoms. The hydrosoluble fatty acid amides are preferably fatty acid amides of mono- or di-($C_{2-3}$-alkanol)-amines. The soap-type fatty acid salts may, e.g. be alkali metal salts, amine salts or unsubstituted ammonium salts. Particularly preferred are unsubstituted ammonium salts of higher saturated fatty acids, in particular of those with 16 to 24 carbon atoms, principally of stearic acid and of hydrogenated tallow fatty acid. Ammonium salts are preferably chosen from those compounds whose decomposition temperature is $\geq 90°$ C., preferably $\geq 100°$ C. Weaker anionic stabilizers ($B_1$), principally the carboxylic acids or their fatty amides, may, if desired, be combined with stronger anionic surfactants ($B_2$), in particular with the above-mentioned sulphonates or preferably with fatty alcohol sulphates, advantageously in the form of their salts, e.g. in the weight ratio $(B_1)/(B_2)$ in the range of 95/5 to 50/50, advantageously 85/15 to 65/35.

The optional foam stabilizer (B) is employed in an effective amount determined by the desire to achieve sufficiently stable foams having the desired fineness and firmness. Dependent on the amount and nature of the other component in the composition (C), the efficient or optimal concentration of (B) may vary over a wide range, for example, by weight (B) may be present in amount of 2 parts by weight per 100 parts of (A). However, depending on the nature of (A) present in the composition (C), relatively stable foams may be possible when (B) is present in amounts from 1 to 5 parts per 100 parts of (A).

The blowing agent may be selected from a solvent or solvent mixture with a boiling point of from 40 to 60° C., preferably 47 to 51° C. Advantageously, the blowing agent is cyclopentane. The temperature at which the blowing agent boils is critical for the working of the invention. If the blowing agent boils at a temperature higher than the indicated range, e.g. in excess of 60° C., the foaming process will have to be conducted at relatively high temperatures to effect blowing. The high temperature will cause the rapid evaporation of water from the composition (C) at a rate detrimental to the formation of the desired foam structure. Conversely, if the blowing agent boils below the indicated range, the temperature in the drying ovens will be so low as to prolong the drying of the foam to unreasonably long periods (in industry standard drying ovens the residence time of the coating in the oven should be no longer than 1 to 1.5 minutes). If the temperature of the oven is increased to accelerate the drying time then the blowing agent will blow too quickly, damaging the foam structure.

The blowing agent is present in the composition in amounts which are related to the content of polymeric material and preferably are from 0.5 to 10 parts and more preferably in amounts of 2 to 4 parts by weight per 100 parts of the component (A) as a dispersion which corresponds to 5 to 10% by weight based on the dry material.

The composition (C) may contain other adjuvants depending on the end application of the foams, for example, dyestuffs, flow-control agents, wetting agents, anti-blocking agents, thickening agents, plasticizers, delustering agents, UV-absorbers and antioxidants.

As dyes there may be employed any suitable dyes as are employed for the dyeing (in particular pigmenting) of polyurethane in the mass, principally disperse dyes or, in particular, pigments which may suitably be dispersed with the aid of dispersants.

As flow control agent or wetting agent there may be employed conventional substances with surface-active character, in particular those with wetting agent or solubilizing character, as are employable in polyurethane coatings, in particular, e.g. aminofunctional polysiloxanes (not defoamers), perfluoroalkyl surfactants, e.g. which are anionactive, such as phosphates, sulphates and carboxylates, or non-ionogenic, such as alkanolamides, or non-ionogenic solubilizers, e.g. mono- or diethyleneglycol-mono-($C_{1-6}$-alkyl)-ether, in particular -mono-($C_{3-4}$-alkyl)-ether. If these flow control or wetting agents are employed, they may be present in amounts of 0.05 to 0.3 parts per 100 parts of (A) and preferably 0.1 to 0.5 parts per 100 parts of (A).

As antiblocking agents there may be used known products, e.g. waxes, advantageously with a softening point in the range of 45 to 130° C., preferably 48 to 105° C., e.g. mineral waxes, synthetic waxes or/and ester waxes, such as montan wax, carnauba wax, ozokerite or beeswax, fats and oils, e.g. mineral oils boiling above 250° C., or optionally modified animal or vegetable fats or oils or even corresponding surrogates (synthetic oils) or (non-defoaming) polysiloxanes, among which the oils are preferred.

To the polymeric binders (A) there may optionally be added plasticizers, e.g. such as defined and described in A. K. Doolittle "The Technology of Solvents and Plasticizers" edited by J. Wiley and Sons Ltd., under the Heading "Plasticizers" and in particular "Softeners", especially in chapter 16, or in Dr. E. Karsten "Lackrohstoff-Tabellen", 7th edition, Curt R. Vincentz Verlag, under the heading "Weichmacher" in chapter 34. The mentioned plasticizers and antiblocking agents may be added in conventional concentrations to the polyurethanes, e.g. in amounts of 0.5 to 50 parts per 100 parts of (A) and preferably 2 to 30 parts per 100 parts of (A).

The delustering agents are substances which are conventional in the art, especially of such a type and in such amounts as are employed in delustering and pigmenting of plastics, in particular polyurethane plastics. As delustering agents there can be employed waxes or silicate-containing substances, e.g. microwaxes, fatty clays, amorphous silica and kaolin. These are expediently compounded into a binder, preferably into a polyurethane, e.g. in a colloidal mill to a masterbatch and employed in this form.

As UV-absorbers and/or antioxidants there may be employed conventional substances. These may be already contained in the respective polymers.

Composition (C) may additionally comprise cross-linking agents, e.g. polyisocyanates or polyaziridines in amounts as suitable for the respective (partial) cross-linking. Among these suitable cross-linking agents, or particular interest are the N-substituted polyaziridines, in particular 1,1,1-tri-[β-(ethyleneaziridino)-propionyloxy]-propane. By cross-linking with the mentioned polyvalent cross-linking agents the soft-handle, the stretchability and the resilience of the finishings may be modified.

The composition (C) to be foamed may be produced by admixture of the respective components. The respective components are preferably employed directly in the form of aqueous compositions as they are formed in their production and/or formulation. After admixture of the respective components, the water content may if required be adjusted to give an aqueous composition with the required solids content. The component (A) may be employed in the form of aqueous concentrated compositions, each with a dry substance content, e.g. of 10 to 60% by weight, preferably 12 to 50%, most preferably 30–40% by weight (depending on the hydrodispersability of the respective polymers). The composition (C) may be prepared from two or more parts; the particular components in each of the parts being selected such that their viscosities are similar to aid mixing.

The compositions (C) formed according to the invention have a content of dry material of 25 to 40% by weight and a viscosity (Ford Cup No. 4 viscosity) of 12 to 50, preferably 15 to 35 and most preferably 20 to 30 seconds. Expressed in Brookfield viscosity, this corresponds to 20 mPas–200 mPas, preferably 50 mPas–100 mPas.

If the composition (C) formed as hereinabove described has a viscosity higher than the desired value the composition may be diluted with the appropriate amount of water; if the viscosity is too low then thickeners, e.g. polyurethane, polyacrylic or casein based thickeners may be added in appropriate quantities.

The foams formed by a method according to the invention have a weight per liter which is advantageously in the range of 480 to 700 g, e.g. 480 to 680 g, preferably 480 to 640 g, more preferably 500 to 600 g at 20° C. and normal pressure.

The foams exhibit a foam cell size, which is substantially smaller than 500 $\mu$m and is typically in the range of 0.1 to 200 $\mu$m, in particular 0.2 to 100 $\mu$m, however, occasionally single foam bubbles may also be larger due to confluence, e.g. in the range of 200 to 1000 $\mu$m.

The foams formed in a process according to the invention are suitable for the production of such coatings as can be produced from the respective polymeric binders (A), in particular for the production of thermoplastic flexible foamed coatings. Suitable substrates for coating may be any conventional stretchable and/or flexible substrates. As flexible and/or stretchable substrates there may be mentioned, e.g. textile material (woven or knitted goods, webs or felts or further—for the coating of the backing—also carpets and velours), paper, fiberboard, cardboard, plastics and leather. Since foams formed by the invention are capable or forming coatings of particularly pronounced stretchability and flexibility and of particularly pronounced resilience, they are particularly suited for coatings on flexible and/or stretchable substrates. They are, before all, preferred for those substrates for which particularly high requirements are set with regard to flexibility, stretchability and resilience, e.g. synthetic leather and especially tanned leather, e.g. for upholstery, footwear, clothing, suitcases, handbags and fancy goods. The leathers may have been tanned and optionally dyed and/or fatted as desired.

The application may be carried out in very simple way using application methods conventional in the art for the application of foam, e.g. by application with a doctor blade or coating with a roller or by spraying with suitable spray guns.

Composition (C) is applied to substrate, in particular leather, in amount of from 50 to 300 g/m², preferably 80 to 300 g/m², e.g. 80 to 280 g/m², and most preferably 80 to 250 g/m².

The amounts of foamable composition (C) applied to substrate may vary depending on the type of substrate. Thus for example, 200 to 250 g/m² may be applied to split leather, 100 to 150 g/m² for buffed leather and 80 to 120 g/m² for full-grain leather.

The amount may also vary depending on the application technique, thus with HVLP guns the preferred quantity is 80 to 200 g/m² whereas with airless and air-mix guns, the quantity may be in the range of 120 to 250 g/m². With roller coaters, however, the quantity is in the range of 50 to 100 g/m².

Prior to application of the composition (C), the leather substrates may be coated with a base-coat, e.g. depending on the substrate and/or on the desired effect, as an adhesive coat, impregnation coat or plain base coating. For the base coat there may be employed conventional, preferably aqueous compositions containing at least one corresponding polymer, e.g. an optionally ionomeric poly(urea)urethane, a (co)polyacrylate or/and a (co)polybutadiene. For the adhesive coat there are preferably employed polyurethanes that are preferably hydroxy-terminated and are composed of polyesterpolyols, short chain diols and aromatic and optionally aliphatic diisocyanates. These base coat compositions may be applied on the substrate and dried in a manner conventional in the art.

The substrates, in particular leather, on which the compositions (C) has been applied can be dried by conventional means, suitably in a tunnel drier. The temperature of a tunnel drier for this purpose may range from 50 to 100° C., preferably 60 to 80° C. The composition (C) must foam and substantially dry whilst being conveyed through a conventional drier system (typically 10 to 20 Meters in length). For practical purposes, the coated substrate will have a residence time of between 60 to 90 seconds in the drier. The pressure may be in any desired range, e.g. up to 260 bar, more preferably $\leq$250 bar.

One or more coatings of the composition (C) may be applied to leather substrate; although generally, one coating is sufficient to achieve the desired effect.

The coatings of the invention are, however, also compatible with other coatings, suitably such coatings that substantially do not impair the foam structure, in particular aqueous-based coatings that may or may not be foamed. For particular color effects there may, e.g. be carried out a color application with an aqueous non-foamed dispersion, containing a pigment and a binder in dispersed form. For this purpose are suitable, in general, known color application compositions. As pigments there may be employed, e.g. those mentioned above. As binders come into consideration, e.g. polymers known for this purpose, e.g. those mentioned above as "thickening agents" or also as mentioned below for the top-coat. The application of these color compositions is preferably carried out by over-spraying, e.g. once or twice, of the material that has been coated with the composition (C) and dried.

The coated substrates, optionally with at least one pre-top coating, e.g. an additional color application composition, are advantageously coated with at least one top-coat. The top-coating may be carried out in a manner known per se on the dried previous coating using conventional products.

Top-coats (in particular top-lacquers) may be used that are casein-based, cellulose acetobutyrate-based, polyurethane-based, nitrocellulose-based or epoxy-resin-based among which the preferred top-coats are polyurethane-based, nitrocellulose-based and epoxy-resin-based, e.g. clear, delustered or/and color-containing (in particular pigment-containing) coats, depending on the desired effect. The top-coat may be dried in conventional way, e.g. in the tunnel drier and finally, depending on the desired aspect of the goods, it may be ironed, embossed or/and milled. By means of the fine foam-finishing of the invention there may be achieved particularly fine embossings.

For the final ironing and/or embossing there may also be used somewhat higher temperatures, e.g. 60 to 120° C.; the pressures may range in any desired range, e.g. between 60 to 260 bar.

Other substrate may be coated by a process analogous to that described above for leather, e.g. synthetic leather or any of the other above-mentioned materials.

According to the invention there may be produced foamed finishing of high bond strength and tensile strength and of high hiding power and fastness, which are distinguished by an outstanding flexibility and stretchability and by a particularly good resilience.

The foamed coatings formed according to the invention are formed with less foamable composition than herebefore achieved.

The foamed coatings are eminently suitable as base coats for top lacquers, e.g. nitro cellulose-based, poly(urea)urethane-based, epoxy-resin-based, cellulose acetobutyrate-based or casein-based as mentioned above.

The finishings produced from the foam coatings, in particular, as applied to leather substrates are distinguished by their full and soft handle and their surprisingly good embossibility.

There now follows a series of examples illustrative of the invention. In the example, all parts are expressed by weight and all temperatures are expressed in degrees Celsius.

EXAMPLES

In all examples cyclopentane is mixed first with the polymer and then with the other components. The composition is homogenized with a stirrer and the viscosity adjusted to a value of 20 seconds (Ford Cup No. 4) corresponding to a Brookfield viscosity of 50 mPas by adding thickener.

The polyurethane thickener used in all examples is of the kind of hydrophobically modified polyether-polyurethanes building associations with other component. The inorganic filler dispersion of all examples also contains organic anti-glue components.

This composition is sprayed on polished upholstery leather in amounts of 110 g/m² and the leather pieces dried at 75° in a drying tunnel of 6 meter length with a running speed of 6.5 meters/minute. The obtained leather pieces have an excellent coating which can be embossed for 3 seconds at 85° with a hydraulic press. Finally, an aqueous top coat containing delustering agent is sprayed on the leather pieces which are milled over night.

Example 1

| | |
|---|---|
| 8 | parts cyclopentane |
| 240 | parts polyurethane dispersion with 35% dry material, the polyurethane based on isophoronediisocyanate, polypropyleneglycol and dimethylolpropionic acid. |
| 25 | parts inorganic filler dispersion (25% dry material). |
| 60 | parts pigment dispersion (20% dry material). |
| 30 | parts water |
| 2 | parts polyurethane thickener |

The final dispersion contains 25% by weight dry material.

Example 2

8 parts cyclopentane
240 parts polyacrylate dispersion (35% dry material), the polyacrylate being a copolymer of ethyl-, butylacrylate and methyl-methylacrylate with glass transition temperature of −15° C.

-continued

```
 25  parts inorganic filler dispersion (25% dry material).
 60  parts pigment dispersion (20% dry material).
 30  parts water
  2  parts polyurethane thickener
```

The final dispersion contains 28% by weight dry material.

Example 3

```
  7  parts cyclopentane
  7  parts foam stabilizer (40% dry material, ammonium stearate)
240  parts polyurethane dispersion with 35% dry material, the
     polyurethane based on isophoronediisocyanate,
     polypropyleneglycol and dimethylolpropionic acid.
 25  parts inorganic filler dispersion (25% dry material)
 60  parts pigment dispersion (20% dry material)
 30  parts water
  2  parts polyurethane thickener
```

The final dispersion contains 30% by weight dry material.

Example 4

```
 10  parts cyclopentane
 80  parts pigment dispersion (20% dry material)
200  parts polyurethane dispersion with 35% dry material, the
     polyurethane based on isophoronediisocyanate,
     polypropyleneglycol and dimethylolpropionic acid.
100  parts polyacrylate dispersion (35% dry material), the polyacrylate
     being a copolymer of ethyl-, butylacrylate and
     methyl-methylacrylate with glass transition temperature
     of −15° C.
 50  parts inorganic filler dispersion (25% dry material)
 25  parts wax dispersion (25% dry material) based on polyethylene.
100  parts water
  3  parts polyurethane thickener
```

The final dispersion contains 28% by weight dry material.

Example 5

```
 12  parts cyclopentane
 80  parts pigment dispersion (20% dry material)
100  parts polyurethane dispersion with 35% dry material, the
     polyurethane based on isophoronediisocyanate,
     polypropyleneglycol and dimethylolpropionic acid.
100  parts polyacrylate dispersion (35% dry material), the polyacrylate
     being a copolymer of ethyl-, butylacrylate and
     methyl-methylacrylate with glass transition temperature
     of −15° C.
100  parts polybutadiene dispersion (40% dry material), the polymer
     being a copolymer of butadiene, acrylonitrile and acrylic acid.
 50  parts inorganic filler dispersion (25% dry material)
 30  parts wax dispersion (25% dry material) based on polyethylene.
 50  parts water
  3  parts polyurethane thickener
```

The final dispersion contains 28% by weight dry material.

Example 6

```
  8  parts cyclopentane
  6  parts foam stabilizer (40% dry material, ammonium stearate)
240  parts polyacrylate dispersion (35% dry material), the polyacrylate
     being a copolymer of ethyl-, butylacrylate and
     methyl-methylacrylate with glass transition temperature
     of −15° C.
 25  parts inorganic filler dispersion (25% dry material)
 60  parts pigment dispersion (20% dry material)
 30  parts water
  2  parts polyurethane thickener
```

The final dispersion contains 28% by weight dry material.

Example 7

```
  8  parts cyclopentane
  7  parts foam stabilizer (40% dry material, ammonium stearate)
160  parts polyurethane dispersion with 35% dry material, the
     polyurethane based on isophoronediisocyanate,
     polypropyleneglycol and dimethylolpropionic acid.
 80  parts polyacrylate dispersion (35% dry material), the polyacrylate
     being a copolymer of ethyl-, butylacrylate and
     methyl-methylacrylate with glass transition temperature
     of −15° C.
 25  parts inorganic filler dispersion (25% dry material)
 60  parts pigment dispersion (20% dry material)
 30  parts water
  2  parts polyurethane thickener
```

The final dispersion contains 28% by weight dry material.

What is claimed is:

1. A process for finishing leather or synthetic leather substrates consisting essentially of:
   (a) applying to a surface of said substrate an aqueous polymeric composition (C) having a dry substance content of 10 to 60 weight percent comprising at least one polymeric binder (A), optionally at least one foam stabilizer (B) and an amount of solvent blowing agent boiling in the range of from 40 to 60° C., effective to foam said composition; and
   (b) applying heat to the coated substrate to foam and cure said polymeric composition (C) to form a flexible foam coating fixed to the substrate surface.

2. A process according to claim 1 wherein the solvent blowing agent is cyclopentane.

3. A process according to claim 1 wherein the blowing agent is present in amounts of from 5 to 10 parts by weight per 100 parts of component (A) as dry material.

4. A process according to claim 1 wherein the polymeric binder (A) consists of a polyurethane, a polyacrylic or polybutadiene resin or a mixture of such resins.

5. A foamed composition obtainable by the process defined in claim 1.

6. A method of applying a foamed coating to leather or synthetic leather substrates consisting essentially of:
   providing a leather or synthetic leather substrate having a surface; applying to the surface of said substrate an aqueous polymeric composition (C) having a dry substance content of 10 to 60 weight percent comprising at least one polymeric binder (A), optionally at least one foam stabilizer (B) and an amount of solvent blowing agent, boiling in the range of from 40 to 60° C., effective to foam said composition; and
   applying heat to the coated substrate to foam and cure said polymeric composition (C) to form a flexible foam coating fixed to the substrate surface.

7. A process according to claim 2 wherein the blowing agent is present in amounts of from 5 to 10 parts by weight per 100 parts of component (A) as dry material.

8. A process according to claim 2 wherein the polymeric binder (A) consists of a polyurethane, a polyacrylic, or polybutadiene resin or a mixture of such resins.

9. A process according to claim 3 wherein the polymeric binder (A) consists of a polyurethane, polyacrylic or polybutadiene resin or a mixture of such resins.

10. A foamed composition obtainable by the process of claim 2.

11. A foamed composition obtainable by the process of claim 3.

12. A foamed composition obtainable by the process of claim 4.

13. The process according to claim 1, wherein the aqueous polymeric composition is applied to the substrate in an amount of from 50 g/m$^2$ to 300 g/m$^2$.

14. The process according to claim 13, wherein the aqueous polymeric composition is applied to the substrate in an amount of from 80 g/m$^2$ to 300 g/m$^2$.

15. The process according to claim 14, wherein the aqueous polymeric composition is applied to the substrate in an amount of from 80 g/m$^2$ to 280 g/m$^2$.

16. The process according to claim 15, wherein the aqueous polymeric composition is applied to the substrate in an amount of from 80 g/m$^2$ to 250 g/m$^2$.

17. The process according to claim 1, wherein the aqueous polymeric composition has a dry substance content of 12 to 50 weight percent.

18. The process according to claim 17, wherein the aqueous polymeric composition has a dry substance content of 30 to 40 weight percent.

19. The process according to claim 17, wherein the aqueous polymeric composition has a dry substance content of 25 to 40 weight percent.

20. The process according to claim 1, wherein the polymeric binder is a polyurethane resin prepared with a macrodiol having a molecular weight in the range of 800 to 5000.

21. The process according to claim 1, wherein the aqueous polymeric composition has a Ford Cup No. 4 viscosity of 12 to 50 seconds.

22. The process according to claim 21, wherein the aqueous polymeric composition has a Ford Cup No. 4 viscosity of 15 to 35 seconds.

23. The process according to claim 22, wherein the aqueous polymeric composition has a Ford Cup No. 4 viscosity of 20 to 30 seconds.

24. The method according to claim 1, wherein the step of applying the polymeric composition to the substrate comprises spraying the polymeric composition onto the substrate.

* * * * *